(No Model.)

B. S. LEATHERS.
INSECT POISON DISTRIBUTER.

No. 376,665. Patented Jan. 17, 1888.

Witnesses.
Robert Pratt
Dennis Sumby.

Inventor:
Bowling S. Leathers.
By James L. Norris.
Atty.

UNITED STATES PATENT OFFICE.

BOWLING S. LEATHERS, OF NEW ORLEANS, LOUISIANA.

INSECT-POISON DISTRIBUTER.

SPECIFICATION forming part of Letters Patent No. 376,665, dated January 17, 1888.

Application filed October 1, 1887. Serial No. 251,215. (No model.)

*To all whom it may concern:*

Be it known that I, BOWLING S. LEATHERS, a citizen of the United States, residing at New Orleans, in the parish of Orleans and State of Louisiana, have invented new and useful Improvements in Apparatus for Distributing Insect-Poison, of which the following is a specification.

My invention relates to the distribution of poison for the destruction of cotton-worms in the field, the purpose thereof being to provide a simple, cheap, and portable device whereby the time and labor involved in scattering the poison is very greatly diminished.

The invention consists in the several novel features of construction and combinations of parts, hereinafter fully set forth and definitely pointed out in the claim following this specification.

Figure 1:
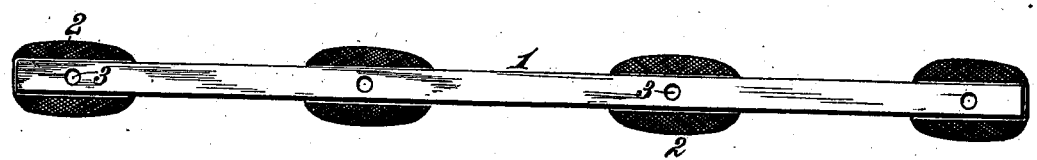
Figure 2:
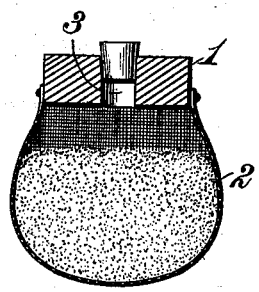

In the accompanying drawings, Figure 1 is a plan view showing the invention. Fig. 2 is a cross-section of Fig. 1.

In the said drawings the reference numeral 1 denotes a pole or bar, preferably of wood, and having any suitable length, twelve feet being about the size found convenient in use. Upon this pole at intervals of about four feet are attached bags 2, formed of coarse canvas or any other foraminous substance—such, for example, as wire-netting of small mesh. These bags are attached in any suitable manner to the pole; but I have shown them as so constructed that openings 3 in the pole will give access to the interior of the bags.

The poisonous substance employed may be paris-green, London purple, or any other dry finely-divided substance suitable for the purpose. This material is placed in the bags in proper quantities, and plugs or corks are afterward inserted in the openings 3 to prevent its escape. The operator then grasps the pole about in the center, and carrying it in his hand or across his lap rides through the field, gently shaking it as he proceeds, whereby the powder is expelled through the meshes of the bags and scattered evenly and thoroughly.

It will be evident, of course, that by varying the speed at which he walks the person using the device can deposit the poison more or less thickly, as the circumstances may require.

The bags 2 are attached at intervals corresponding to the distance between the rows, and by traversing the field once the operator can deposite the poison upon four rows. The length of the pole might be increased or diminished, as may be desired; but if increased it would probably be necessary to mount the apparatus upon a carriage. This could easily be done and the vibration imparted to the pole by means of cams on one of the wheels.

What I claim is—

In a device for distributing insect poison, the pole or bar having openings formed therein at intervals, in combination with bags formed of textile fabric or wire-net attached thereto, and with which said openings communicate, substantially as described.

In testimony whereof I affix my signature in presence of two witnesses.

BOWLING S. LEATHERS.

Witnesses:
  M. DUNCAN,
  J. R. EDGETT.